United States Patent
Viegas et al.

(10) Patent No.: US 9,552,352 B2
(45) Date of Patent: Jan. 24, 2017

(54) ENRICHMENT OF NAMED ENTITIES IN DOCUMENTS VIA CONTEXTUAL ATTRIBUTE RANKING

(75) Inventors: Evelyne Viegas, Redmond, WA (US); Eric Anthony Rozell, Queensbury, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 574 days.

(21) Appl. No.: 13/293,139

(22) Filed: Nov. 10, 2011

(65) Prior Publication Data
US 2013/0124964 A1 May 16, 2013

(51) Int. Cl.
*G06F 17/21* (2006.01)
*G06F 17/27* (2006.01)

(52) U.S. Cl.
CPC .................. *G06F 17/278* (2013.01)

(58) Field of Classification Search
CPC ....................................................... G06F 17/278
See application file for complete search history.

(56) References Cited

U.S. PATENT DOCUMENTS

| | | | |
|---|---|---|---|
| 6,581,064 B1 | 6/2003 | Senjalia | |
| 7,401,057 B2 | 7/2008 | Eder | |
| 7,899,666 B2 | 3/2011 | Varone | |
| 7,933,897 B2 | 4/2011 | Jones et al. | |
| 7,970,766 B1 | 6/2011 | Shamsi et al. | |
| 2004/0243407 A1* | 12/2004 | Yu et al. | 704/240 |
| 2008/0098026 A1* | 4/2008 | Kraft et al. | 707/102 |
| 2008/0208864 A1* | 8/2008 | Cucerzan et al. | 707/8 |
| 2008/0294978 A1* | 11/2008 | Klintsov et al. | 715/234 |
| 2009/0265338 A1 | 10/2009 | Kraft et al. | |
| 2010/0082331 A1* | 4/2010 | Brun et al. | 704/9 |
| 2010/0287210 A1* | 11/2010 | Olof-Ors | G06F 17/278 707/803 |
| 2011/0040717 A1 | 2/2011 | Rho et al. | |
| 2011/0078162 A1 | 3/2011 | Nie et al. | |

FOREIGN PATENT DOCUMENTS

WO WO 2010/050844 * 5/2010 ............. G06F 17/27

OTHER PUBLICATIONS

Wang, et al., "Language-Independent Set Expansion of Named Entities using the Web", Retrieved at <<http://www.cs.cmu.edu/afs/cs/Web/People/wcohen/postscript/icdm-2007.pdf>>, Seventh IEEE International Conference on Data Mining, Oct. 28-31, 2007, pp. 342-350.

* cited by examiner

*Primary Examiner* — Asher Kells
(74) *Attorney, Agent, or Firm* — Alin Corie; Sandy Swain; Micky Minhas

(57) ABSTRACT

Technologies pertaining to retrieval of contextually relevant attribute values for an automatically identified named entity in a document are described herein. Named entity recognition technologies are employed to identify named entities in the text of a document. Context corresponding to an identified named entity is analyzed to probabilistically assign a class to the named entity. Attributes that are most relevant to the class are determined, and attribute values for such attributes are retrieved. The attribute values are presented in correlation with the named entity in the document responsive to user-selection of the named entity in the document.

20 Claims, 5 Drawing Sheets

ENRICHMENT OF NAMED ENTITIES IN DOCUMENTS VIA CONTEXTUAL ATTRIBUTE RANKING

BACKGROUND

The World Wide Web is a system of interlinked hypertext documents that are accessible via the Internet. Through utilization of a web browser, a user can load a web page that includes text, images, videos and other multimedia, and can navigate between webpages by way of selection of hyperlinks. The amount of information that is available on the World Wide Web has increased dramatically since its inception, causing retrieval of information that is relevant to a particular user's interests to be a complex problem. Search engines have been developed, wherein a search engine is tasked with indexing web pages, receiving textual queries from users, and providing a ranked list of web pages that are believed to be most relevant to the users (based upon the queries). Due to the massive number of web pages that are available, however, it is often times difficult to provide users with relevant information.

To help users access information, computer-executable systems have been developed that attempt to address the need for machine-readable web content, where the World Wide Web is no longer perceived as being a collection of web pages, but rather a web of entities with relations therebetween. While technologies and specifications exist for identifying named entities in web pages available on the World Wide Web (and annotating such web pages to identify named entities), there is currently a lack of technologies that "bridge the gap" between the web of documents (web pages) and the web of data (entities and their relations). In other words, conventionally, to retrieve additional information about a named entity in a document, users must employ hyperlinks to seek out contextual information from external sources. In an example, a web page may include the named entity "Barack Obama", and such named entity can be automatically identified. A hyperlink can be added to the text, wherein the hyperlink links the web page with another web page (e.g., a Wiki page) that includes additional information about the named entity. Therefore, if a user wishes to acquire additional information about the named entity, the user can select the hyperlink and be directed towards another web page.

Oftentimes, however, owners of a web page will desire that the user remain on such web page for an extended amount of time. For instance, search engines aim to keep users viewing their pages longer by presenting structured data from external sources locally, thereby increasing the likelihood of generating revenue from that user (e.g., when the user selects an advertisement). Acquiring structured data in a manner that is not time and labor intensive, however, is a focus of ongoing research.

SUMMARY

The following is a brief summary of subject matter that is described in greater detail herein. This summary is not intended to be limiting as to the scope of the claims.

Described herein are various technologies pertaining to the automatic provision of contextually relevant structured data to a user. A document, such as a web page, a word processing document, or the like includes text, wherein such text includes named entities. Named entity recognition (NER) (also known as entity identification and entity extraction), is a subtask of information extraction that seeks to locate and classify atomic elements in text into predefined categories, such as the names of persons, organizations, locations, expressions of times, quantities, monetary values, percentages, etc. Accordingly, a named entity, as used herein, can be a person, organization, location, time, concept, event, or other suitable noun or noun phrase. In an exemplary embodiment, a NER system can be employed to automatically detect named entities in text of a document. For instance, an exemplary NER system can include natural language processing technologies to automatically identify named entities in the text of the document. In another example, the document may include metadata that identifies named entities in the text of the document. Pursuant to an example, a web page can be annotated with structured data using a specification such as RDFa, HTML microdata, or the like.

Subsequent to a named entity in the document being identified, the named entity and other text in the document can be provided to a named entity classification system, which can automatically assign a class to the named entity based at least in part upon the named entity and its context (other text in the document and/or user context). For instance, a web page may include the named entities "Peyton Manning", "Tom Brady", and "Brett Favre", who are professional American football quarterbacks. The named entity classification system, based upon this collection of named entities, can infer that the named entity "Peyton Manning" refers to a professional quarterback and can assign the classification of quarterback to the named entity "Peyton Manning".

Subsequent to the class for the named entity being inferred and assigned to the named entity, the class can be provided to an attribute ranking system that can return a ranked list of attributes that are determined to be most relevant attributes for the class. An exemplary technique for returning ranked attributes is to analyze a search engine index for common co-occurrence of a class and defined attributes. Other techniques for ranking attributes corresponding to one or more classes are contemplated and are intended to fall under the scope of the hereto-appended claims.

Accordingly, named entities in the text of the document are automatically identified, and attributes that are most relevant to the named entity with respect to its context in the web page (and/or user context) can be automatically determined. A search can then be conducted for values of such attributes through use of the named entity and most relevant attributes. In an example, the search can be executed over a data repository that includes structured data (e.g., scraped from the web). In another example, queries can be automatically formulated to retrieve attribute values by way of conventional search engine technologies. In an example, for the named entity "Peyton Manning" with a class of "professional quarterback" being assigned thereto, most relevant attributes may be determined to be "team(s)", "touchdown passes," "completion percentage," and "quarterback rating." Values for such attributes can be automatically retrieved from any suitable data repository.

In accordance with an exemplary embodiment, the named entities and attributes can be provided to a web browser as annotations in a browser ready markup language, such as XML or HTML. The named entity can be highlighted in the text of the document to inform a reviewer of the document that attribute values corresponding to the named entity are available responsive to the user selecting the named entity. The user may select the named entity, for instance, by hovering a cursor over the named entity in the document.

Responsive to the reviewer of the document selecting the highlighted named entity, the attributes and corresponding attribute values can be displayed as an overlay on the document, thereby providing the user with contextually relevant attribute values for the named entity. Therefore, the reviewer of the document can be provided with contextually relevant information for a named entity of interest without being forced to navigate away from the document.

Other aspects will be appreciated upon reading and understanding the attached figures and description.

DETAILED DESCRIPTION

Figure 1:
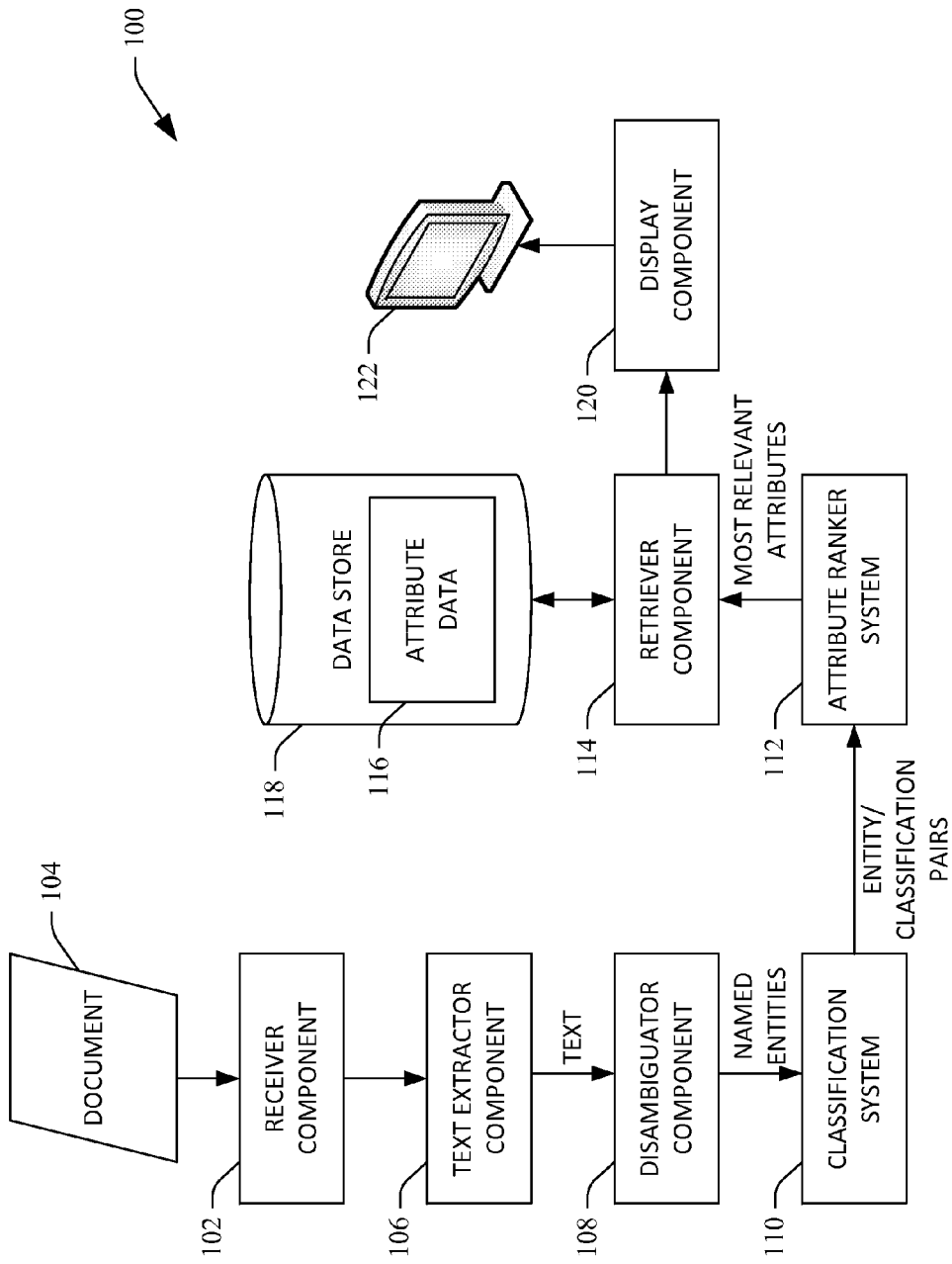
FIG. 1 is a functional block diagram of an exemplary system that facilitates provision of entity-specific contextually relevant attribute values to a reviewer of a document.

Various technologies pertaining to named entity enrichment in a document via contextual attribute ranking will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Technologies pertaining to named entity recognition, named entity classification, and attribute ranking for named entities are described herein. The examples set forth below disclose the recognition of named entities in a document that are embodied as text in the document. Such examples are set forth for purposes of illustration only. The technologies described herein can also be employed with enriching named entities with context-dependent data when such named entities are recognized in images (e.g., a person can be recognized as a named entity in an image). In another example, a named entity can be recognized in an audio signal, and such named entity can be enriched via retrieval of context-dependent attribute values. Other examples where named entities can be recognized will be recognized by one skilled in the art. Additionally, the context-dependent values that are provided to a user are described herein as being text that can be read by the user. Again, such context-dependent attribute values are not intended to be so limited, as such values may be embodied as images, audio signals, or the like. Thus, it is to be understood that the description below pertaining to text is intended to be for illustrative purposes only, as the inventors contemplate other embodiments.

With reference now to FIG. 1, an exemplary system 100 that facilitates 1) retrieval of contextually relevant attribute values with respect to a named entity in a document that comprises text; and 2) provision of such attribute values to a reviewer of the document is illustrated. The system 100 comprises a receiver component 102 that receives a document 104 that comprises text. The document 104 may be a web page, a word processing document, a slideshow presentation document, a spreadsheet, or other suitable document that comprises text. A text extractor component 106 is in communication with the receiver component 102, and extracts text from the document 104. A disambiguator component 108 receives the text extracted by the text extractor component 106, analyzes such text, and identifies named entities in the text. In other words, the text comprises a word or phrase that represents a named entity, wherein the named entity is a noun or noun phrase, the meaning of which can be augmented by certain attributes and values. Accordingly, a named entity may be a person, a place a concept a tangible or intangible item, etc.

Named Entity Recognition (NER) refers to technologies that locate and classify atomic elements in text into pre-defined categories, such as the names of persons, organizations, locations, expressions of times, quantities, monetary values, percentages, etc. Accordingly, a named entity can be a person, organization, location, time, concept, event, or other suitable noun or noun phrase. In an exemplary embodiment, the disambiguator component 108 can be or be included in a NER system.

In an exemplary embodiment, the disambiguator component 108 can employ natural language processing (NLP) technologies to automatically identify named entities in the text of the documents. In another exemplary embodiment, the disambiguator component 108 may include, or have access to, a dictionary of pre-defined named entities, and can locate named entities in the text by comparing the pre-defined named entities in the dictionary with the text of the document 104. In yet another exemplary embodiment, the document 104 may include metadata that identifies named entities in the text of the document 104, and the disambiguator component 108 can analyze the metadata in the document 104 to identify named entities therein. Exemplary metadata that can be employed to identify named entities in the text of the document 104 include RDFa and/or HTML microdata.

If the document 104 does not already include annotations that identify named entities therein, the disambiguator component 108 can generate annotated text, wherein the annotated text includes annotations that identify named entities in the document 104. The disambiguator component 108 can output the annotated text, and the output annotated text can be received by a classification system 110. The classification system 110, which can also be referred to as an entity classification system, can assign respective classes to named entities identified by the disambiguator component 108 in the annotated text. The classification system 110 can utilize any suitable named entity classification technologies, including supervised and/or unsupervised models for named entity recognition.

With more particularity, the classification system 110 can analyze content of the document 104 (the text of the document 104) to ascertain a context corresponding to a named entity therein. In an example, if the named entity in the document is "Peyton Manning" and the text of the document also includes named entities "Tom Brady" and "Brett Favre," the classification system 110, based upon the context in the document 104 related to the named entity of interest ("Peyton Manning") can assign the class "professional quarterback" to the named entity "Peyton Manning." In another example, the text of the document 104 may include the named entity "Michael Jordan." Depending on the context, the named entity "Michael Jordan" may refer to a professional basketball player, a collegiate basketball player, a professional basketball team owner, a minor league baseball player, or a researcher in the field of machine learning. The classification system 110 is configured to automatically assign classes probabilistically to each named entity identified by the disambiguator component 108 based upon context of the named entity in the document 104 (and/or user context). The term "context" is intended to encompass text in the document 104 other than the named entity (e.g., other identified named entities in the document). The term "context" is also intended to encompass the context of a user. For instance, if a recent query history of the user included the queries "Thomas Jefferson," "Dwight Eisenhower," and "Abraham Lincoln," the named entity "Washington" in the document 104 may have a context corresponding to the class "United States presidents" (rather than the class "states of the United States of America").

The system 100 can further comprise an attribute ranker system 112 that receives classes assigned by the classification system 110 and determines most relevant attributes for such classes. Continuing with the example set forth above, most relevant attributes for professional quarterbacks may be determined by the attribute ranker system 112 as being team(s), passing yardage, touchdown passes, completion percentage, and quarterback rating. In another example, the class "presidents of the United States" may have most relevant attributes as being years of presidency, birthdate, and birthplace. In an exemplary approach, most relevant attributes can be computed by analyzing an index of Web documents for co-occurrence of the class with certain attributes. Most frequently co-occurring attributes with the class can be with output by the attribute ranker system 112 as being most relevant attributes for the class. In another approach, most relevant attributes for a class can be manually generated and retained in a data repository and retrieved by the attribute ranker system 112 responsive to receiving an assignment of a class from the classification system 110.

A retriever component 114 can receive a top threshold number of attributes output by the attribute ranker system 112 as well as the named entity located by the disambiguator component 108 and can retrieve values for the attributes for the named entity. Specifically, the retriever component 114 can access a data store 116 that comprises attribute data 118. There currently exist numerous Web-accessible structured data sources that retain attribute values for named entities. Alternatively, a proprietary database may include structured data that comprises attribute values for named entities. In an exemplary embodiment, the attribute data 118 may be structured data, such that a query that specifies the named entity and a particular attribute can be employed to retrieve an attribute value for the named entity and the particular attribute from the attribute data 118. In another exemplary embodiment, the retriever component 114 can generate a query and provide such query to a search engine, which can search over indexed documents using the query to retrieve attribute values. Again, the query can include the named entity and a recitation of a particular attribute.

A display component 120 receives the attribute values retrieved by the retriever component 114 as well as identities of the corresponding attributes output by the attribute ranker system 112. The display component 120 can highlight the word or phrase in the text of the document 104 that represents the named entity to inform a reviewer of the document 104 that contextually relevant attribute values are available responsive to the reviewer of the document 104 selecting the named entity in the document 104. That is, a user can be reviewing the document 104 on a display screen 122 of a computing device, which may be a desktop computer, a laptop computer a mobile telephone, a tablet computing device, a portable gaming console, a mobile media player, etc. Responsive to the display component 120 receiving attribute values for a recognized named entity in the text of the document 104, the display component 120 can highlight the named entity in the document 104, thereby informing the user of the document 104 that attribute values that are contextually relevant to the named entity in the document 104 are available to the reviewer of the document 104 responsive to such reviewer selecting the named entity in the document 104. The reviewer of the document 104 can select the named entity in the document 104, for instance, by hovering a cursor over the named entity in the document 104. In another example, the reviewer of the document 104 can employee voice commands to select the word or phrase that represents the named entity in the document. In still yet another example, the reviewer of the document 104 utilize a mouse-click to select the named entity in the document 104, may touch a touch sensitive display screen at a location of the named entity in the document 104, etc.

The display component 120 can receive an indication that the reviewer of the document 104 has selected the named entity, and responsive thereto can cause the attribute values that are contextually relevant to the named entity to be presented to the reviewer of the document 104 on the display screen 122. The attribute values may be presented in a pop-up window, as a tooltip, may be audibly output to the reviewer of the document 104, or the like. In any event, the reviewer of the document 104 need not navigate to a different document to acquire the contextually relevant attribute values.

In an exemplary embodiment, the document 104 may be a web page that is loaded into a web browser of a computing device. In an example, the owner of the web page may wish to cause the reviewer of the document 104 to keep the web page loaded in the browser as long as possible. In other words, to generate revenue, it is desirable that the reviewer of the document 104 keeps the web page loaded into the web browser and does not navigate to a different web page. Using the system 100, the reviewer of the document 104 (the webpage) can receive contextually relevant attribute values for a named entity in the webpage without having to navigate away from the web page. Further, the creator of the web page need not embed the attribute values into the web page. Rather, such contextually relevant attribute values are automatically retrieved and provided to the user through utilization of the system 100.

In another exemplary embodiment, the document 104 may be a word processing document. In such an exemplary embodiment, the system 100 can continuously operate as a user modifies the document 104. Accordingly, if the user is generating a report, the system 100 can identify that the user has typed a particular named entity into the document 104, can assign a class to such named entity based on other text in the document, can automatically locate most relevant attributes for the class, and retrieve attribute values for such attributes. Thereafter, the named entity typed into the document 104 by the user can be highlighted to inform the user that contextually relevant attribute values are available for such named entity responsive to the user selecting the named entity in the document 104. In such an example, the modifier of the document 104 need not perform a web search to acquire certain attribute values for named entities discussed in the document 104, as contextually relevant attribute values are provided to the user in real time.

In another exemplary embodiment, the system 100 may be a distributed system. For example, the text extractor component 106 and the disambiguator component 108 can be included as a plug-in to a web browser or word processing application. The classification system 110 may be a web-accessible system that receives annotated text output by the disambiguator component 108 by way of a suitable network connection. The classification system 110 may then return classes assigned to named entities back to a client-side application. Alternatively, the classification system 110 can transmit classes assigned to named entities directly to the attribute ranker system 112, which may be a separate web-accessible system. Similarly, the retriever component 114 may be yet another separate system that can receive most relevant attributes and named entities from the attribute ranker system 112 directly or from the client-side application. The data store 116 may be a network-accessible data store, and the display component 120 can be included as a portion of the client-side application. In an exemplary embodiment, the retriever component 114 can provide attribute values to the display component 120 in a browser ready markup language, such as XML or HTML. The display component 120 may utilize any suitable web scripting language in connection with providing an interactive experience to the reviewer of the document 104.

Figure 2:
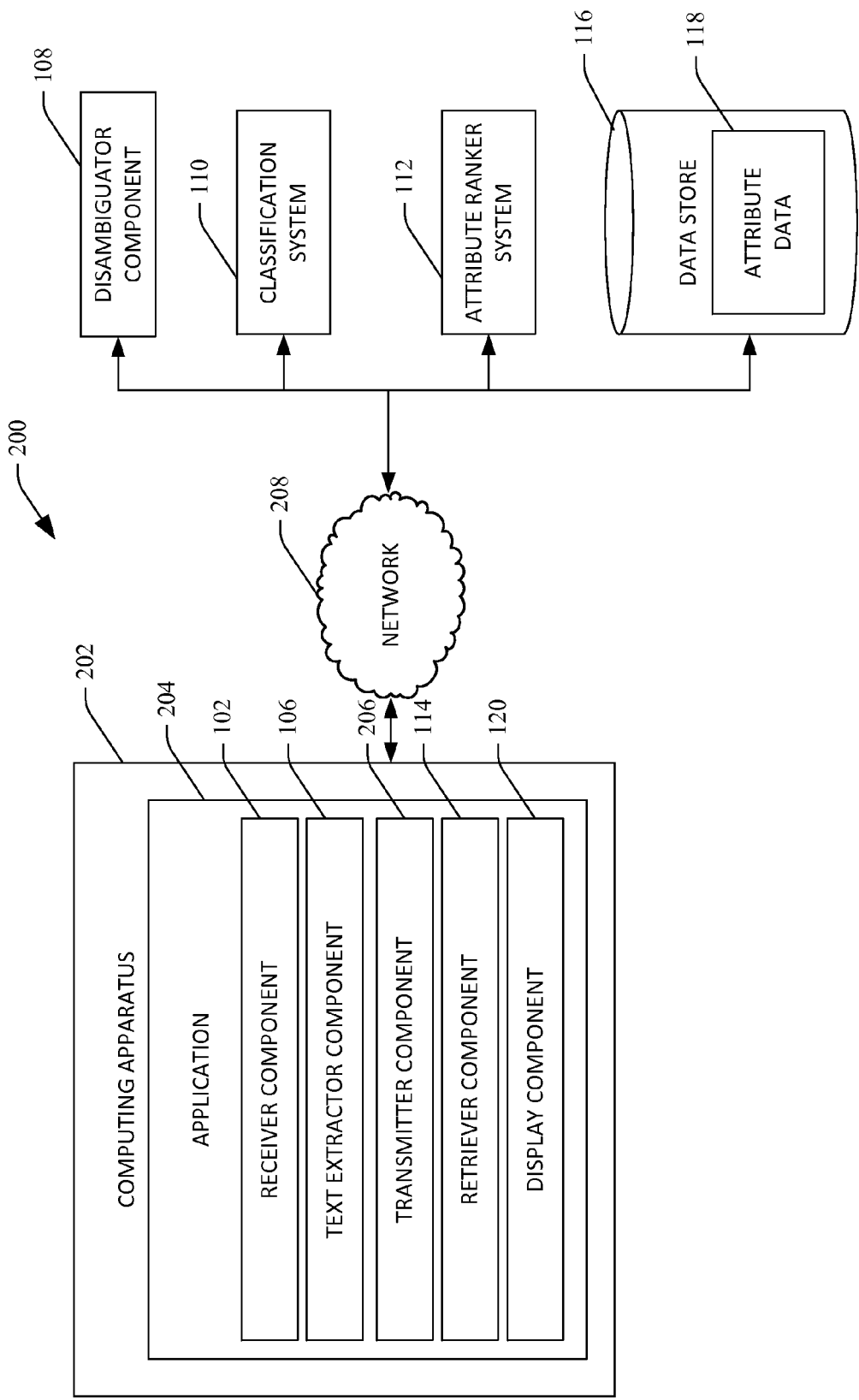
FIG. 2 is a functional block diagram of an exemplary system that facilitates provision of contextually relevant attribute values with respect to a named entity found in text of a document.

With reference now to FIG. 2, an exemplary system 200 that facilitates automatic retrieval of attribute values that are contextually relevant to a named entity in a document being reviewed by a user is illustrated. The system 200 comprises a computing apparatus 202, which may be any suitable type of computing apparatus, including but not limited to a desktop computer, a laptop computer, a mobile telephone, a gaming console, a mobile gaming console, a tablet computing device, a portable media player, or the like. The computing apparatus 202 has an application 204 executing thereon. Hardware of the computing apparatus 202 may include a memory and processor, wherein the application 204 is composed of instructions retained in the memory that are executable by the processor. In another example, the computing apparatus 202 can include system on a chip and/or cluster on chip technology, and the application 204 can be distributed across multiple processor cores. The application 204 may be a web browser that is executing on the computing apparatus 202, a word processing application, or the like.

The application 204 includes the receiver component 102 that receives the document 104. For instance, the user of the computing apparatus 202 can cause the application 204 to load the document. Alternatively, the application 204 can include text editing capabilities such that the user is creating/modifying the document 104. The application 204 also includes the text extractor component 106 that extracts text from the document 104.

The application 204 may also include a transmitter component 206 that is configured to transmit data/commands to systems that, are accessible by way of a network 208. In an exemplary embodiment, the network 208 may be or include the Internet, a cellular telephone network, or the like. The transmitter component 206 can transmit the text of the document 104 that has been extracted by the text extractor component 106 and transmit such text by way of the network 208 to the disambiguator component 108. The disambiguator component 108 reviews the text of the document 104 extracted by the text extractor component 106 and generates annotated text, wherein the annotated text identifies named entities in the text of the document 104. The disambiguator component 108 may then transmit the annotated text to the computing apparatus 202.

The transmitter component 206 can receive an indication from the disambiguator component 108 that a named entity has been identified in the text of the document 104, and can transmit the named entity and corresponding contextual data to the classification system 110 by way of the network 208. As described above, the contextual data corresponding to the named entity can be other text in the document 104 (other named entities) and may also include user context.

The classification system 110 assigns a class to the identified named entity based upon the provided context and, in an example, transmits the assigned class back to the application 204 executing on the computing apparatus 202. The receiver component 102 receives the assigned class for the entity, and the transmitter component 206, responsive to the receiver component 102 receiving the assigned class, transmits the class by way of the network 208 to the attribute ranker system 112. The attribute ranker system 112 determines most relevant attributes for the assigned class and transmits such attributes back to the application 204 executing on the computing apparatus 202 by way of the network 208. In an exemplary embodiment, the attribute ranker system 112 can consider data other than the named entity and the assigned class when outputting most relevant attributes. For instance, the attribute ranker system 112 can determine most relevant attributes for the named entity based upon the assigned class as well as user context, which can be or include time of day, day of week, previous user interaction with respect to documents, or the like.

The receiver component 102 receives the attributes for the assigned class and the retriever component 114, which is shown as being included in the application 204 automatically generates queries and queries the data store 116 for attribute values existent in the attribute data 118. The retriever component 114 retrieves the attribute values responsive to the receiver component 102 receiving the attributes from the attribute ranker system 112. The receiver component 102 can receive the attribute values retrieved by the retriever component 114, and the display component 120 can cause the named entity to be highlighted to a reviewer of the document 104, thereby informing such reviewer that attribute values that are contextually relevant to the named entity are available for review responsive to the reviewer of the document 104 selecting the named entity in the document.

It is to be understood that the embodiment shown in FIG. 2 is exemplary in nature, and is not intended to limit the scope of the hereto-appended claims. For instance, in an exemplary embodiment, the application 204 may also include the disambiguator component 108, the classification system 110, and/or the attribute ranker system 112. Similarly, the application 204 may not include the text extractor component 106, and/or the retriever component 114. Instead, such components may be included in separate network-accessible systems. Further, the network accessible systems may be configured to communicate directly with one another. In such an embodiment, the classification system 110 can assign a class to a named entity, and can provide such class directly to the attribute ranker system 112 without the application 204 acting as an intermediary. These and other embodiments are contemplated in and are intended to fall under the scope of the hereto-appended claims.

Figure 3:
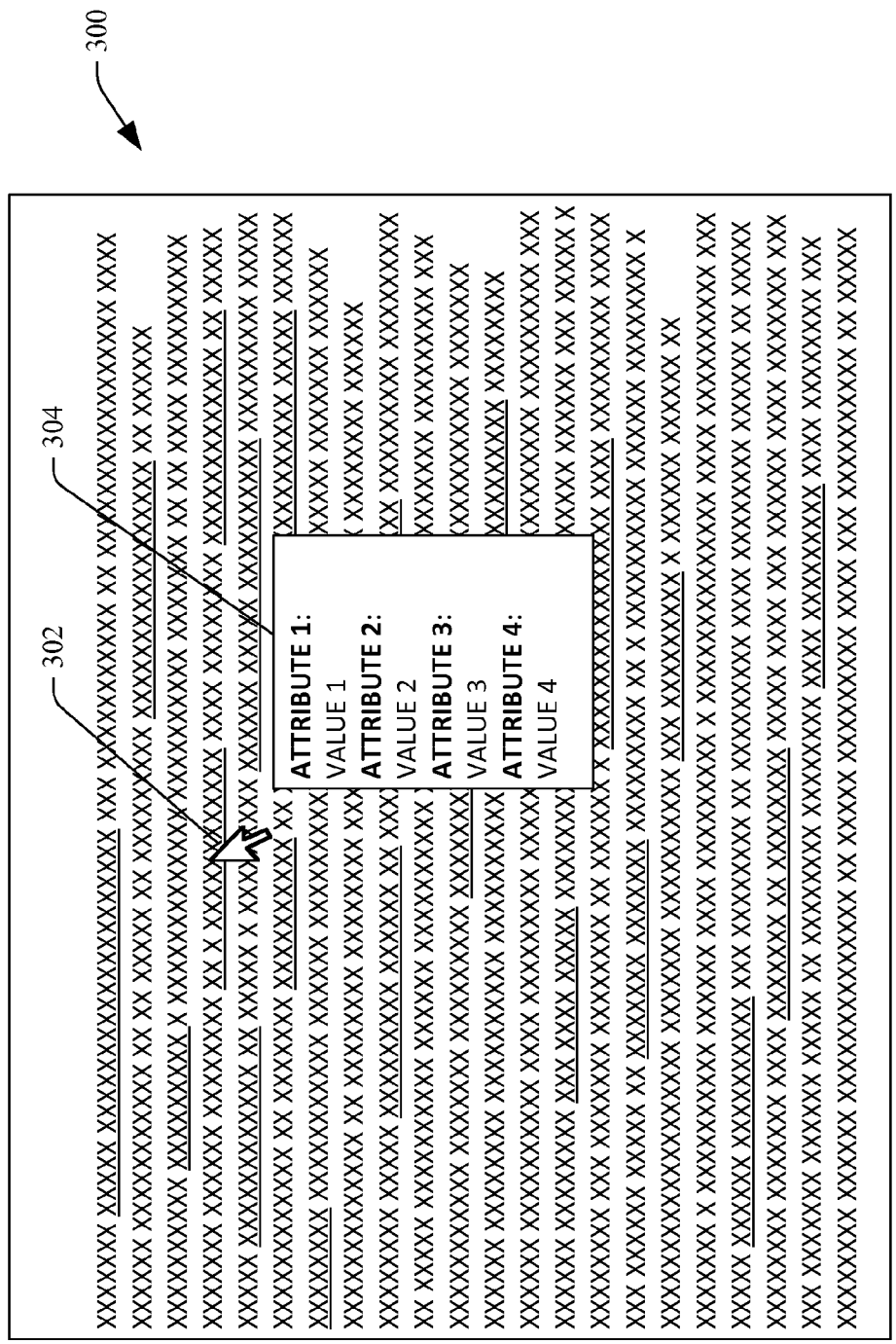
FIG. 3 is an exemplary graphical user interface.

With reference now to FIG. 3, an exemplary graphical user interface 300 that illustrates presentation of contextually relevant attribute values with respect to a named entity in a document being viewed by a user is illustrated. As shown, the graphical user interface 300 displays text, wherein some of such text (named entities in the text) is highlighted. In the graphical user interface 300, named entities are shown as being underlined; it is to be understood, however, that named entities may be assigned certain background colors, may be displayed in a different font than other text in the document, may be displayed in bold font, may be italicized, or the like to indicate to a reviewer of the document that contextually relevant attribute value values are available for the named entity responsive to the user selecting the named entity.

The graphical user interface 300 also includes a cursor 302 that is employed by the user to select a particular highlighted named entity in the document. While the graphical user interface 300 is shown as including the cursor 302, it is to be understood that other techniques for selecting a named entity in a document are contemplated and are intended to fall under the scope of the hereto-appended claims, such as speech recognition techniques, gesture recognition, eye-tracking technologies, or the like. Responsive to the user selecting the named entity with the cursor 302, (hovering the cursor 302 over a particular named entity) a tooltip 304 is graphically presented in graphical correlation to the selected named entity, wherein the tooltip 304 includes attribute identities and values. For example, if the selected named entity is "Peyton Manning" attribute one may be "team" and the attribute value may be an identity of the team that employs Peyton Manning; attribute two may be "touchdown passes", and attribute value two may be a number of career touchdown passes for Peyton Manning; attribute three be "completion percentage", and attribute value three may be the career completion percentage of Peyton Manning, and so on. It can thus be ascertained that a reviewer of the document shown in the graphical user interface 300 can be provided, in an automated fashion, with values for attributes that are contextually relevant to the named entity in the document without being forced to leave the document (navigate to a different web page to locate the attribute values).

Figure 4:
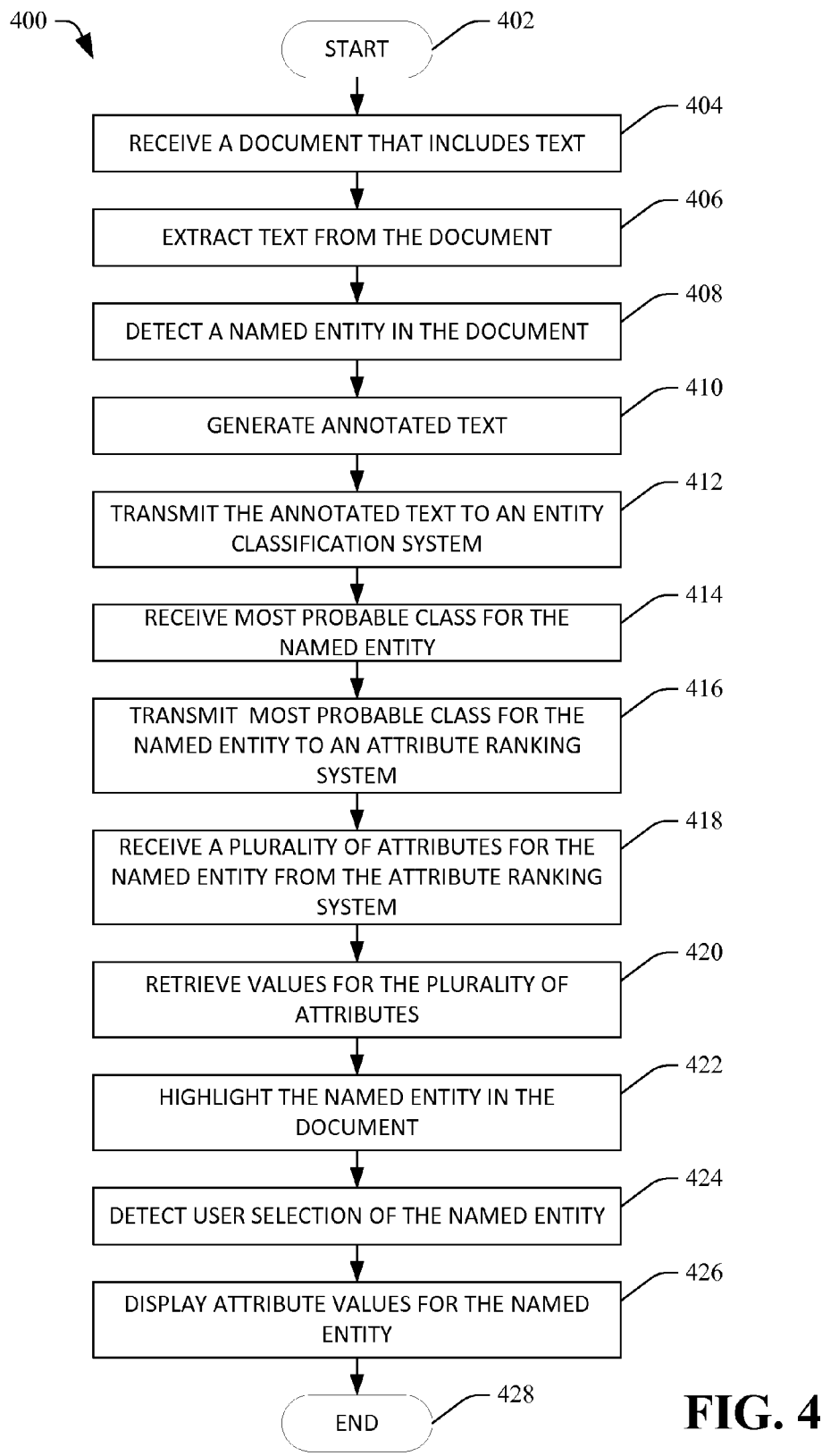
FIG. 4 is a flow diagram that illustrates an exemplary methodology for displaying attribute values for an automatically located named entity in a document.

With reference now to FIG. 4, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement the methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 4, an exemplary methodology 400 that facilitates display of contextually relevant attribute values with respect to a named entity in a document is illustrated. The methodology 400 starts at 402, and at 404 a document that includes text is received. As mentioned above, such document may be a web page a word processing document, or the like.

At 406, text is extracted from the document, and at 408 existence of a named entity is detected in the text of the document, wherein the named entity is a noun or noun phrase in the text.

At 410, annotated text is generated, wherein the annotated text includes the text of the document and at least one annotation that identifies the named entity in the text. At 412, the annotated text is transmitted to an entity classification system. The entity classification system assigns a class from a plurality of possible classes to the named entity based at least in part upon the text and the annotation(s) that identifies the named entity in the text.

At 414, the class assigned by the entity classification system is received from the entity classification system. Then, at 416, the assigned class for the identified named entity is transmitted to an attribute ranking system. The attribute ranking system determines a plurality of attributes that are relevant to the named entity in the document given that the named entity has been assigned the class. In other words, most relevant attributes for the class are determined by the attribute ranking system.

At 418, a plurality of attributes for the class are received from the attribute ranking system. At 420, values for the plurality of attributes received at 418 are retrieved. As indicated above, queries can be automatically generated to search over one or more data repositories to retrieve the attribute values for the plurality of respective attributes.

At 422, subsequent to receiving the plurality of attribute values, the named entity in the document is highlighted. This informs a reviewer of the document that contextually relevant attribute values for the named entity are available responsive to the reviewer of the document selecting the named entity in the text.

At 424, it is detected that a reviewer of the document has selected the named entity, and at 426, responsive to detecting that the reviewer of the document has selected the named entity in the document, the attribute values for the plurality of respective attributes are displayed on a display screen of a computing device. For instance, such attribute values can be displayed as a tooltip, in a pop-up window, or the like. The methodology 400 completes at 428.

Figure 5:
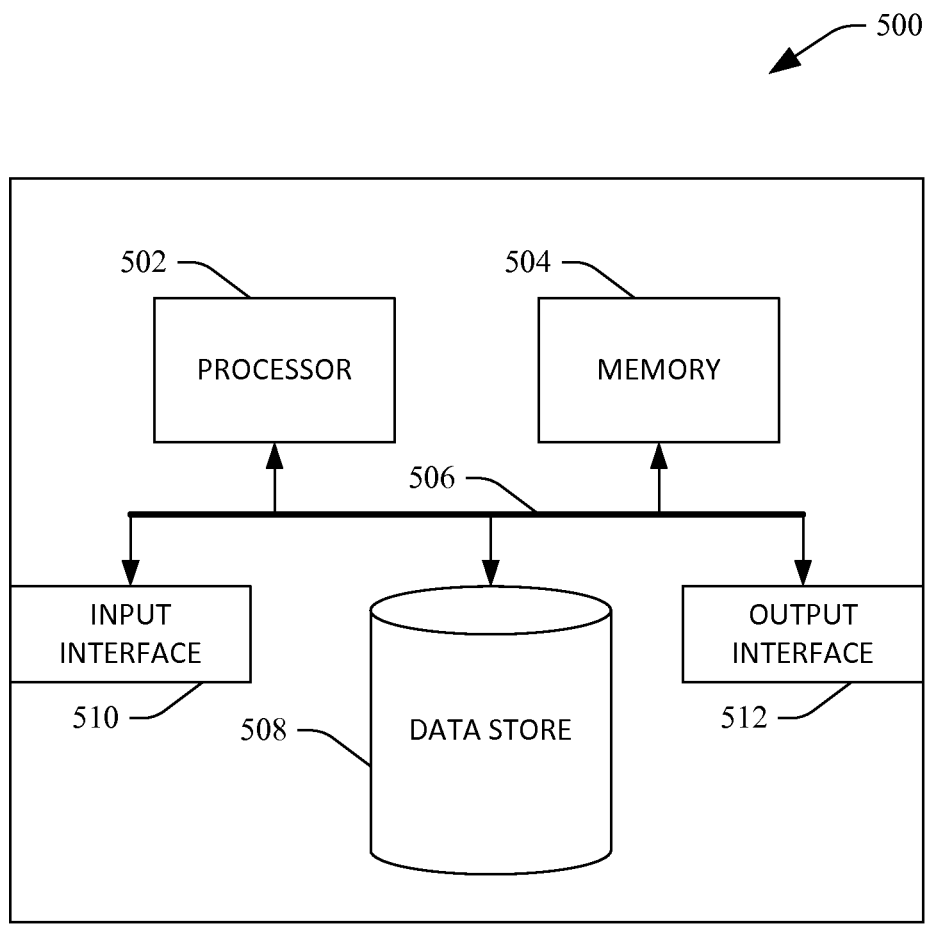
FIG. 5 is an exemplary computing system.

Now referring to FIG. 5, a high-level illustration of an exemplary computing device 500 that can be used in accordance with the systems and methodologies disclosed herein is illustrated. For instance, the computing device 500 may be used in a system that supports named entity recognition. In another example, at least a portion of the computing device 500 may be used in a system that supports named entity classification. The computing device 500 includes at least one processor 502 that executes instructions that are stored in a memory 504. The memory 504 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store attributes, classes, attribute values, etc.

The computing device 500 additionally includes a data store 508 that is accessible by the processor 502 by way of the system bus 506. The data store may be or include any suitable computer-readable storage, including a hard disk, memory, etc. The data store 508 may include executable instructions, attribute values, attributes, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. byway of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising plurality of acts that are executed by at least one processor in at least one computing device, the acts comprising:
   extracting text from a document;
   detecting existence of a named entity in the text of the document;
   generating annotated text responsive to detecting the existence of the named entity in the text of the document, the annotated text comprising an annotation that identifies the named entity in the text;
   transmitting the annotated text to an entity classification system, the entity classification system assigning a class from a plurality of possible classes to the named entity based at least in part upon the annotated text;
   receiving from the entity classification system data that identifies the class assigned to the named entity by the entity classification system;
   transmitting the data that identifies the class to an attribute ranking system, the attribute ranking system determining a plurality of attributes that are relevant to the class;
   receiving from the attribute ranking system the plurality of attributes that are relevant to the class;
   responsive to receiving the plurality of attributes, retrieving values for the plurality of attributes for the named entity;
   subsequent to retrieving the values for the plurality of attributes, causing the named entity to be highlighted in the document when the document is displayed on a display of a client computing device, the named entity highlighted to inform a user of the client computing device that additional data about the named entity is available, wherein the client computing device displays, on the display, the values for the plurality of attributes for the named entity responsive to detecting that the user has selected the named entity in the document.

2. The method of claim 1, wherein detecting existence of the named entity in the text of the document comprises executing at least one natural language processing algorithm to detect the existence of the named entity in the text of the document.

3. The method of claim 1, wherein the document comprises metadata that identifies the named entity in the document, and wherein detecting existence of the named entity in the text of the document comprises analyzing the metadata.

4. The method of claim 1, wherein the document is a web page, and wherein the values for the plurality of attributes for the named entity are displayed in the web page without causing the user to leave the web page.

5. The method of claim 4 being executed in a web browser.

6. The method of claim 1, wherein the document is a word processing document, the method further comprising performing the acts of the method while the user modifies the word processing document.

7. The method of claim 1, wherein the client computing device displays, on the display, the values for the plurality of attributes for the named entity responsive to detecting that the user has one of hovered a cursor over the named entity, made a gesture towards the named entity, selected the named entity via touch, or eyes of the user being focused on the named entity.

8. The method of claim 1, wherein retrieving values for the plurality of attributes for the named entity comprises:
   constructing a query that comprises the named entity and at least one attribute from the plurality of attributes; and
   searching over a web-accessible data repository through utilization of the query.

9. The method of claim 8, wherein the web-accessible data repository comprises structured data.

10. The method of claim 1, further comprising:
    disambiguating the text in the document to identify a plurality of different named entities;
    acquiring attribute values corresponding to attributes of each named entity identified in the text; and
    causing portions of the text to be highlighted to inform the user that the attribute values are available with respect to each named entity identified in the text.

11. The method of claim 1, further comprising:
    accessing a data repository that comprises user history data; and
    at least one of transmitting the user history data to the entity classification system, wherein the entity classification system assigns the class to the named entity based at least in part upon the user history data; or
    transmitting the user history data to the attribute ranking system, wherein the attribute ranking system determines the plurality of attributes that are relevant to the class based at least in part upon the user history data.

12. A system that facilitates provision of contextually relevant data to a user, the system comprising:
    at least one processor; and
    memory comprising instructions that, when executed by the at least one processor, cause the at least one processor to perform acts comprising:
       receiving a document that comprises text, the text comprising a named entity;
       identifying the named entity in the text;

responsive to identifying the named entity in the text and based upon the named entity, inferring a class to which the named entity belongs, the class being amongst a plurality of possible classes;

responsive to inferring the class to which the named entity belongs transmitting the data that identifies the class to an attribute ranking system, the attribute ranking system determining attributes that are relevant to the class;

receiving from the attribute ranking system the attributes that are relevant to the class; and retrieving values for the attributes for the named entity responsive to receiving the attributes; wherein the values for the attributes for the named entity are displayed as a graphical overlay in the document responsive to a reviewer of the document selecting the named entity on a client computing device.

13. The system of claim 12, wherein the named entity is highlighted in the document to inform the reviewer of the document that the values for the attributes have been retrieved for the named entity.

14. The system of claim 12, the at least one processor executes the instructions in response to a web browser requesting the document.

15. The system of claim 12, the at least one processor executes the instructions when executing a word processing application.

16. The system of claim 12, wherein the acts further comprise receiving an indication from the client computing device that the reviewer of the document has selected the named entity in the document.

17. The system of claim 12, wherein a tooltip that comprises the attribute values is displayed on the client computing device responsive to the reviewer of the document selecting the named entity at the client computing device.

18. The system of claim 12, wherein the document is a word processing document, wherein retrieving the attribute values comprises retrieving the attribute values as the reviewer of the word processing document is modifying the word processing document, wherein named entities entered into the word processing document are highlighted immediately responsive to retrieving the attribute values.

19. A computer-readable medium comprising instructions that, when executed by a processor, cause the processor to perform acts comprising:

identifying named entities in text of a web page;

subsequent to identifying the named entities in the text, annotating the named entities in the text to form annotated text;

transmitting the annotated text to a named entity classification system, wherein the named entity classification system probabilistically assigns classes to respective named entities in the annotated text;

receiving class assignments for the respective named entities from the named entity classification system;

for each unique class received from the named entity classification system, transmitting the respective unique class to an attribute ranking system, wherein the attribute ranking system outputs lists of attributes that are relevant to the respective classes;

receiving from the attribute ranking system, for each unique class, attributes that are relevant to a respective unique class;

retrieving attribute values for the received attributes for each named entity in the text of the web page, wherein the attribute values are retrieved from a data repository that comprises structured data, wherein each named entity in the web page has at least one attribute value associated therewith to inform a reviewer of the web page that additional information pertaining to the named entities is available, wherein attribute identities and corresponding values for a named entity are displayed in response to the named entity being selected in the web page.

20. The system of claim 12, wherein a pop-up window that comprises the attribute values is displayed on the client computing device responsive to the reviewer of the document selecting the named entity at the client computing device.

* * * * *